United States Patent

[15] 3,672,215

Stout et al.

[45] June 27, 1972

[54] APPARATUS EMPLOYING DIODE JUNCTION MEANS FOR MEASURING SUBTERRANEAN TEMPERATURES

[72] Inventors: Beauford F. Stout, Grandview; George W. Hann, Fort Worth, both of Tex.

[73] Assignee: Worth Well Surveys, Inc., Fort Worth, Tex.

[22] Filed: Sept. 8, 1969

[21] Appl. No.: 855,981

[52] U.S. Cl. ........................................... 73/154, 181/.5 FS
[51] Int. Cl. ...................................................... F21b 49/00
[58] Field of Search ......................... 307/310; 324/1; 181/.5; 73/154

[56] References Cited

UNITED STATES PATENTS

| | | | |
|---|---|---|---|
| 2,676,489 | 4/1954 | Basham | 73/342 |
| 3,330,158 | 7/1967 | Simonyan et al. | 73/262 |
| 3,421,375 | 1/1969 | Dimon | 73/362 |
| 3,430,077 | 2/1969 | Bargen | 307/310 |
| 3,490,286 | 1/1970 | Schwartz | 73/362 |

Primary Examiner—Samuel Feinberg
Assistant Examiner—N. Moskowitz
Attorney—Wofford and Felsman

[57] ABSTRACT

Apparatus for measuring temperatures and temperature anomalies along the longitudinal axis of a borehole penetrating subterranean formations characterized by a temperature sensor comprising a power supply and a temperature-compensated constant current regulator connected with at least one diode junction for flowing a constant current through the diode junction, the voltage drop across the diode junction varying linearly with temperatures over the range of 60°–350° F and linearly enough to be usable to temperatures as high as 400° F. In a specific disclosed embodiment, a unijunction transistor generates, in response to the voltage drops across the diode junction, frequency-type signals which are sent to the surface; an integrator is provided for integrating the signals to effect an indication of temperatures; and a differentiator is provided for differentiating the output from the integrator to effect a differentiated temperature indication to delineate anomalies. The temperatures and differentiated temperature indications are ordinarily recorded with respect to depth. Specific structures of the diode junction and of the temperature-compensated constant current regulator are also disclosed.

4 Claims, 2 Drawing Figures

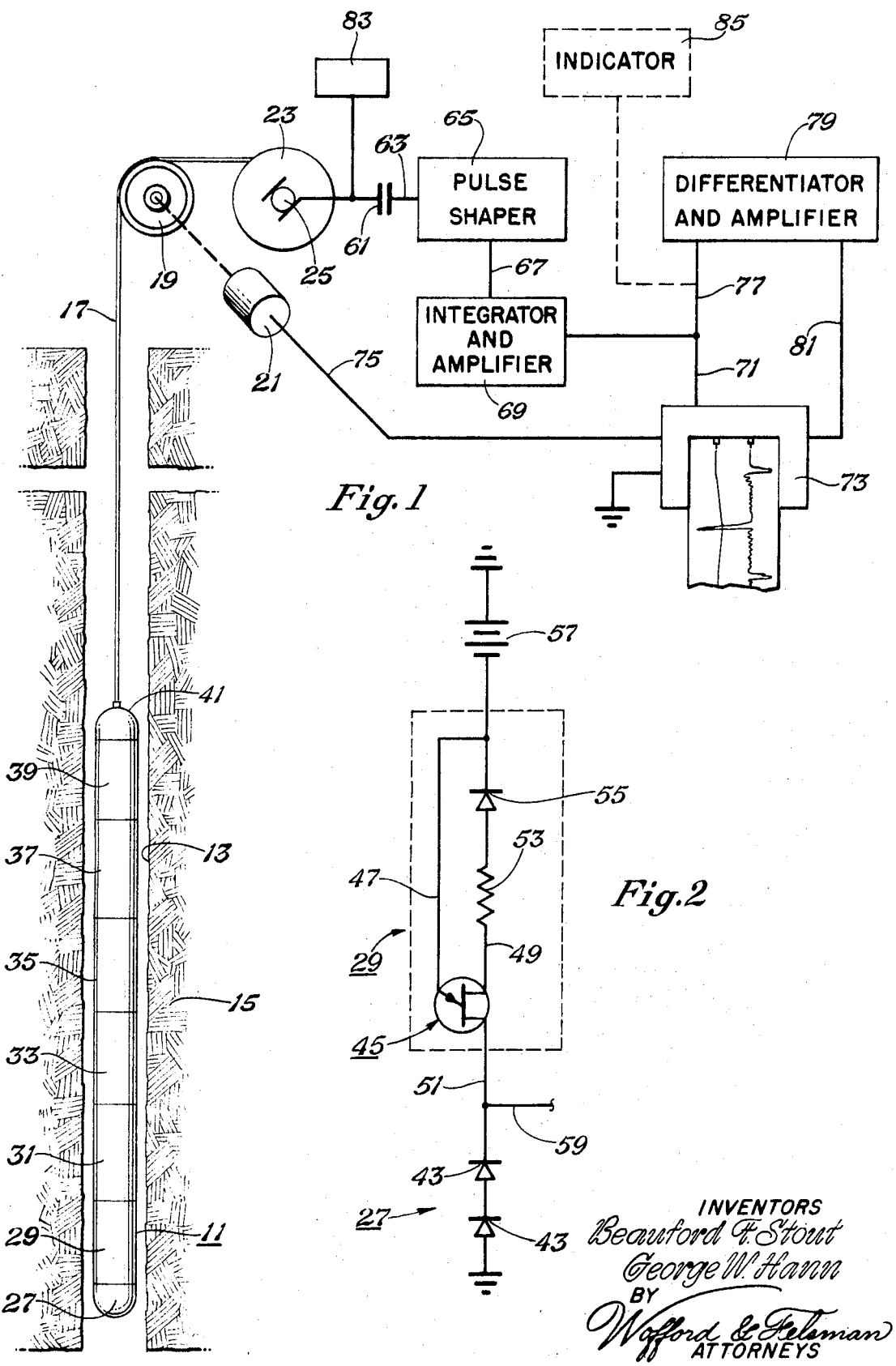

APPARATUS EMPLOYING DIODE JUNCTION MEANS FOR MEASURING SUBTERRANEAN TEMPERATURES

BACKGROUND OF THE INVENTION

1. Field of the Invention

This invention relates to measuring temperature in boreholes penetrating subterranean formations.

2. Description of the Prior Art

It has long been recognized that a profile of temperature along boreholes penetrating subterranean formations could convey useful information to the petroleum engineer or geologist. For example, expansion of gas from a gas zone or gas cap into a wellbore effects a cooler than normal temperature. Such temperature anomaly may effect a reversal in the thermal gradient at one or more points along the wellbore. Thief zones along the borehole may mark abrupt changes in the temperature. In measuring solely the absolute temperature along the borehole, the changes may be so small as to be overlooked since they will be only a very small percentage of the total. If, however, a differential of the temperature is taken, the temperature anomalies are delineated with great clarity. The problem in the prior art approaches has been to obtain a temperature sensor that was linear over the range of temperature encountered in most subterranean formations; for example, temperatures of up to 350° F.

It is known in the prior art to employ thermocouples to measure downhole temperatures. With thermocouples the different metals form a junction that generates a spontaneous EMF which is indicative of the temperature. Thermocouples have been demonstrated to be disadvantageous because of the very small EMF's generated and the difficulties in translating the temperature into useful information at the surface.

It is known in the prior art to use two temperature sensors; such as, thermistors; spaced a distance apart and their output compared. This approach has been useful for several years in delineating temperature anomalies. This approach was not altogether satisfactory since it depended upon two essentially non-linear sensors spaced at different points in the wellbore.

More recently, a single temperature sensor was employed in the downhole tool and the output of the sensor at one location stored in a computer and the difference between it and a subsequent reading at another depth computed. This approach was expensive, elaborate, and complex; and also suffered when the temperature sensor was non-linear.

The prior art devices ordinarily employed thermistors in practical embodiments although thermistors are notoriously non-linear. Sensistors were tried. Although less non-linear than transistors, the sensistors had positive temperature coefficients and were more difficult to employ in borehole tools at the elevated temperatures encountered in subterranean formations, and they were still non-linear to an appreciable degree.

BRIEF DESCRIPTION OF THE DRAWING

FIG. 1 is a diagrammatic representation of apparatus embodying the invention being used to log temperatures along a borehole penetrating subterranean formations.

FIG. 2 is a partial electrical schematic diagram showing the temperature sensor and the temperature-compensated constant current regulator useful in one embodiment of the invention.

DESCRIPTION OF PREFERRED EMBODIMENTS

It is a primary object of this invention to provide method and apparatus for measuring temperatures along the longitudinal axis of a borehole penetrating subterranean formations employing a temperature sensor that has a negative temperature coefficient and is accordingly readily useful; and that is linear over the range of temperatures encountered in most subterranean formations.

Other specific objects will be apparent from the following descriptive matter taken in conjunction with the drawings.

Referring to FIG. 1, downhole tool 11 is suspended in borehole 13 penetrating subterranean formations 15 by cable 17. Cable 17 passes over depth measuring sheave 19 which drives a depth function generating means 21. Cable 17 is spooled from or onto cable drum 23, and has conductor means electrically connecting elements in the downhole tool via conventional slip rings and brushes 25 with the remainder of the surface equipment.

Downhole tool 11 comprises respective sections housing temperature sensor 27, constant current regulator 29, amplifier means 31, signal generating means 33, transmitter, or output, means 35, power supplies 37, collar locator and amplifier 39, and cable head 41.

Temperature sensor 27 comprises diode junction means having at a constant current flow a substantially linearly varying voltage drop over the range of temperatures of 60°–350° F. While the diode junction means may comprise a single diode junction, it is preferable to employ a plurality of such diode junctions 43, FIG. 2, connected in series to increase the sensitivity of the temperature sensor thereby effected and, consequently, reduce the requirements on the remainder of the electronic elements in the downhole tool. A particularly preferred temperature sensor is formed by eight of the diode junctions created by serially connecting two units of four diode junctions each. Diode junctions formed in silicon diodes are excellent in providing the requisite linearity between 60° and 350° F. In fact, they are linear enough to be useful at temperatures as high as 400° F. Other diode junctions; such as those formed in germanium or even in the compound semiconductor materials; may be employed when they behave similarly. While this invention is not to be limited by theory, it appears that the diode junction has available a greater number of electrons and holes for carrying the constant current as the temperature increases. Consequently, there is a lower voltage drop across the junction at elevated temperatures. There is, in effect, a sort of an expansion of the junction also as the temperature increases. While different diode junctions may have the desired linearly varying voltage characteristics over certain ranges at different current levels, it has been found that with silicon diodes, a current level of about one-half milliampere affords satisfactory results. The one-half milliampere is an excellent amount of current to break down the diode when it is forward biased, yet not create other problems, such as overheating. Current levels may be varied between a few hundredths of a milliampere to the temperature at which the diode begins to heat up; ordinarily, for example, about 60 milliamperes.

Constant current regulator means 29 comprises a field effect transistor 45, FIG. 2. Field effect transistor 45 has its gate lead 47 connected with one lead 49 which may be source or drain depending on polarity of the interconnection. Field effect transistor 45 has its other lead 51 connected with respective diode junction means 43. To maintain the flow of current constant regardless of change in temperature as the downhole tool 11 traverses borehole 13, a series connected resistor means typified by resistor 53 and a diode means typified by diode 55 are employed in the circuit connected with intermediate lead 49 and the juncture of gate lead 47 and power source 57. The resistor 53 and diode 55 may be reversed and obtain the same result. Power source 57 is indicated as a battery although it may be a DC voltage tapped from any appropriate source.

Although the embodiment illustrated in FIG. 2 forms a simple and dependable constant current regulator, any other constant current regulator means that will maintain the current constant may be employed. In any event, the constant current regulator means and the power supply means are serially connected with the diode junction means for maintaining a constant current flowing through the diode junction means.

An amplifier means 31 in the operational amplifier section of the downhole tool is connected with the diode junction means and adapted for generating an output signal that is a function of the voltage drop across the diode junction means.

As illustrated in FIG. 2, conductor 59 connects the amplifier means with the juncture of the diode junction means and the constant current regulator means. The amplifier means generates an output signal that is a function of the voltage present at this juncture. The amplifier means may be any amplifier capable of generating an output signal that is uniquely representative of the voltage present at the juncture of the diode junction means and the constant current regulator means. For example, it has been found that an operational amplifier capable of effecting a voltage between a positive 15 volts and a negative 15 volts upon the change of the voltage on conductor 59 of from about a negative 5.6 volts down to about a negative 3 volts is satisfactory. The term operational amplifier is a term of art and adequately describes the amplifier means for effecting the desired results. Suitable operational amplifiers are commercially available. An operational amplifier that has been found satisfactory is the Philbrick T-52. It effects output voltages beginning at about plus 7.5 volts (v) at a voltage input of minus 5.6 v on conductor 59; growing more negative at a ratio of about 9:1; and finally effecting about minus 11 v output at a voltage input of about minus 3 v on conductor 59. With a sufficient number of diode junctions in the diode junction means, the amplifier means may be omitted. For example, with about 80 diode junctions serially connected in the diode junction means, the amplifier means can be omitted, and the tool remain operable with only a minor modification of the signal generating means, as described hereinafter.

The signal generating means 33 in the signal generating means section of the downhole tool is connected with the amplifier means for generating signals that are a function of the output signal from the amplifier means. Specifically, a unijunction transistor may be employed to oscillate at a frequency that increases as the voltage output signal grows more negative. Thus, it will be seen that the frequency-type signal from the unijunction transistor is a function of the temperature being measured by temperature sensor 27. For example, one unijunction transistor found useful oscillates at an output of about five cycles per second per degree F. This increasing frequency coupled with the initial threshold of oscillation produces about 2,000 cycles per second at a temperature of about 300° F. The unijunction transistor employed as the signal generating means should preferably be linear over the ranges of the output signal. It has been found that a D5K1 or a 2N492 type unijunction transistor will operate satisfactorily. These unijunction transistors are commercially available. While the unijunction transistor has been described as the signal generating means and converts the output signal of the amplifier means into a frequency-type signal, any other signal generating means may be employed if it will effect an output signal that can be transmitted to the surface and be uniquely related to a temperature measured in the borehole. If a large number of diode junctions are employed in the diode junction means, the amplifier means is omitted, and the same relationship of frequency and temperature are employed, then the polarity impressed across the diode junction means is reversed. On the other hand, the polarity may be preserved and an inverse relationship of frequency and temperature employed such that the frequency decreases as the temperature increases. Where the amplifier means is omitted and the signal generating means is connected directly to the diode junction means, it may be advisable to alter the voltage level of operation of the signal generating means. In the example given hereinbefore, employing about 80 diode junctions in the diode junction means, the upper voltage of operation of the unijunction transistor, comprising the signal generating means, might be about a positive 50 volts and grow more negative with increasing temperature to about a positive 30 volts, the voltage base being maintained by suitable means such as Zener diodes. The unijunction transistor would accordingly see about the same voltage change it presently sees by way of the operational amplifier.

The transmitter means 35 in the output section of downhole tool 11 is connected with the signal generating means for transmitting the signal to the above-ground equipment. It has been found that a satisfactory transmitter means comprises a transformer and two transistors. The resulting transmitter means will satisfactorily transmit the frequency-type signals to the above-ground equipment.

In the above-ground equipment, converting means is connected with the transmitter means in the downhole tool for effecting an analog indication of the temperature encountered in the wellbore in response to the received signals. As illustrated in FIG. 1, the frequency-type signals are sent through coupling capacitor 61 and via conductor 63 to pulse shaper 65 for accurate pulse control and, thence, via conductor 67 to integrator and amplifier 69. In the integrator, the frequency-type signals are integrated and amplified to effect an analog indication of the temperature in the borehole in response to the signals. The analog indication is sent over conductor 71 to recorder 73 on which a chart is being moved in response to depth signals from the depth function generating means 21 via conductor 75. If desired, an indicator 85 can be connected with conductor 77 to effect a direct indication of the temperature being logged without having to advert to the chart on recorder 73. The analog indication of temperature from integrator and amplifier 69 is also sent via conductor 77 to differentiator and amplifier 79. The differentiated and amplified analog signal from differentiator and amplifier 79 is also sent to recorder 73 via conductor 81.

Conventional integrating circuits and conventional differentiating circuits can be employed for integrating the frequency-type signals and for differentiating the resulting analog signal. As indicated before, the analog signal affords an indicia of the temperature actually measured at a given depth in the borehole. Accordingly, it changes relatively little, and minute changes might escape detection. On the other hand, a differential of the analog signal indicates a change in the temperature gradient and is very useful in delineating temperature anomalies, although it is not of value for determining the actual, or absolute temperature measured in the borehole. Expressed otherwise, the analog signal from integrator and amplifier 69 affords a good indication of the actual temperature being measured whereas the differentiated signal is too unstable to be very useful in this respect, but is very useful in pointing up changes in the temperature gradient and thus delineating temperature anomalies.

While, as indicated hereinbefore, batteries can be employed in the downhole tool, it has been found preferable to supply power at the surface and generate power of the proper polarities for the respective power sources downhole. As illustrated in FIG. 1, a DC power source 83 is connected downstream of coupling capacitor 61 to facilitate supplying DC power downhole. It has been found that a positive 125 volts can be supplied and enable obtaining the requisite AC and Dc power in the downhole tool via appropriate power supply means 37 in power supply section.

It has been found, for example, that a minus 24 volts DC may be generated by DC—DC converter in the tool and it affords a satisfactory power source to which to connect the constant current regulator means. This enables satisfactorily controlling the current through the diode junction means at a desired current level of about one-half milliampere.

In the power supply section, the output from the DC—DC converter may be rectified or respectively tapped and rectified to effect the requisite plus or minus 15 volts for the operational amplifier.

In operation, tool 11 is traversed along the longitudinal axis of borehole 13. Temperature sensor 27 will effect a voltage on conductor 59. As indicated, the voltage may start out about a minus 5.6 volts for 8 diode junctions in series at surface temperatures and decrease linearly with increasing temperature to a voltage in the range of about a minus 3 volts at temperatures of about 350° F. The operational amplifier amplifies the signal to form an output signal that is a function of the voltage and consequently of the temperature. Responsive to the output signal from the operational amplifier, the unijunction transistor oscillates at a given frequency for each magnitude output signal. The frequency-type signal, consisting of at least pulses of a given polarity, are transmitted uphole by a transmitter means 35 in the output section. The collar locator and amplifier in collar locator section 39 may be employed, if desired, to ensure greater accuracy in measuring the depth within the borehole and as a supplemental check on the depth measuring means. In any event, the frequency-type signal is transmitted over a single conductor in cable 17, the armor of which serves as ground to slip rings and bushes 25 on cable drum 23.

As indicated before, power is supplied from power supply 83 through cable 17 to the power section where it is appropriately tapped to generate the requisite voltages for use in downhole tool 11.

The frequency-type signal is sent by way of coupling capacitor 61, which blocks the direct current power from power source 83, to pulse shaper 65. Pulse shaper 65 effects uniform pulses which are integrated by integrator and amplifier 69. The resulting analog signal is sent to recorder 73 to record with respect to depth the temperature measured in the borehole. The analog signal is also differentiated by differentiator and amplifier 79 and the resulting differentiated analog signal recorded via a pen on recorder 73 to delineate temperature anomalies, or changes in the temperature gradient.

Thus, it can be seen that the invention provides a highly accurate temperature sensor that has a linear output over the range of temperatures normally encountered in boreholes penetrating subterranean formations, yet has a negative temperature coefficient so it is readily employed in borehole apparatus; and, consequently, obviates the disadvantages of the prior art approaches to measuring temperature in a borehole.

Although the invention has been described with a certain degree of particularity, it is understood that the present disclosure has been made only by way of example and that numerous changes in the details of construction and the combination and arrangement of parts may be resorted to without departing from the spirit and the scope of the invention.

What is claimed is:

1. In apparatus for measuring temperature and change in temperature in a borehole penetrating subterranean formations by employing aboveground equipment; a downhole tool suspended on a cable within said borehole for movement along the longitudinal axis of said borehole; and depth measuring means for determining the depth of said tool in said borehole, the improvement comprising:
   a. diode junction means for measuring temperature, said diode junction means being disposed in said downhole tool and having a substantially linearly varying voltage drop at a constant current within the temperature range of 60°–350° F;
   b. a power supply means and a temperature-compensated constant current regulator means for maintaining a constant current flowing through said diode junction means regardless of variations in temperature along said borehole, said power supply means and said temperature-compensated constant current regulator means being serially connected in the forward biased direction with said diode junction means; said temperature-compensated constant current regulator means comprising a field effect transistor serially connected via one lead with said diode junction means and via the other lead with a resistor means and a diode means for temperature compensation; the gate of said field effect transistor being connected with said other lead at the juncture of said power source and said serially connected diode means and resistor means;
   c. signal generating means for generating signals that are a function of the voltage present at the juncture of said diode junction means and said constant current regulator means, said signal generating means being connected with said diode junction means;
   d. transmitter means for transmitting said signals to the above-ground equipment, said transmitter means being connected with said signal generating means and with conductor means in said cable for effecting an electrically continuous path;
   e. converting means for effecting an analog indication of said temperature in response to said signals, said converting means being disposed in said above-ground equipment and connected via said conductor means with said transmitter means;
   f. differentiator means for differentiating said analog indication of temperature to effect an indication of temperature anomalies along the longitudinal axis of said borehole, said differentiator means being connected with said converting means; and
   g. recorder means for recording with respect to depth said analog indication of temperature and said indication of temperature anomalies, said recorder means being connected with said depth measuring means, with said converting means and with said differentiator means.

2. The apparatus of claim 1 wherein said diode junction means comprise a plurality of diode junctions employed in series to increase sensitivity of the temperature sensor thereby effected.

3. The apparatus of claim 1 wherein an amplifier means is serially connected with said diode junction means and with said signal generating means for generating and supplying to said signal generating means an output signal that is a function of the voltage present at said juncture of said diode junction means and said constant current regulator means.

4. The apparatus of claim 3 wherein said diode junction means comprise a plurality of diode junctions employed in series to increase sensitivity of the temperature sensor thereby effected.

* * * * *